United States Patent
Harrington

(10) Patent No.: US 6,169,607 B1
(45) Date of Patent: Jan. 2, 2001

(54) PRINTING BLACK AND WHITE REPRODUCIBLE COLORED TEST DOCUMENTS

(75) Inventor: Steven J. Harrington, Webster, NY (US)

(73) Assignee: Xerox Corporation, Stamford, CT (US)

(*) Notice: Under 35 U.S.C. 154(b), the term of this patent shall be extended for 0 days.

(21) Appl. No.: 08/752,191

(22) Filed: Nov. 18, 1996

(51) Int. Cl.[7] .................................................. G06F 15/00
(52) U.S. Cl. ............................ 358/1.9; 358/462; 358/528
(58) Field of Search .................................. 395/110, 150, 395/109, 114, 200, 115; 382/183, 190, 54, 258, 257, 259, 266; 358/226, 528, 451, 518, 523, 530, 1.15, 1.14, 1.9, 462

(56) References Cited

U.S. PATENT DOCUMENTS

| | | | |
|---|---|---|---|
| 3,807,852 | 4/1974 | Hoydic | 355/7 |
| 4,308,553 | 12/1981 | Roetling | 358/75 |
| 4,369,461 * | 1/1983 | Tamura | 358/75 |
| 4,688,031 * | 8/1987 | Haggerty | 340/793 |
| 4,703,318 | 10/1987 | Haggerty | 346/723 |
| 5,098,817 | 3/1992 | Voorhees | 430/396 |
| 5,138,465 | 8/1992 | Ng et al. | 358/153 |
| 5,142,337 | 8/1992 | Karidis et al. | 355/266 |
| 5,153,576 | 10/1992 | Harrington | 340/793 |
| 5,153,739 | 10/1992 | Laman et al. | 358/300 |
| 5,201,032 * | 4/1993 | Kurose | 395/150 |
| 5,291,243 | 3/1994 | Heckman et al. | 355/201 |
| 5,309,548 * | 5/1994 | Ohta et al. | 395/109 |
| 5,321,470 | 6/1994 | Hasuo et al. | 355/201 |
| 5,408,343 * | 4/1995 | Sugiura et al. | 358/520 |
| 5,485,278 * | 1/1996 | Nakajima | 358/296 |
| 5,485,288 * | 1/1996 | Kamei et al. | 358/530 |
| 5,568,248 | 10/1996 | Wagley | 355/328 |
| 5,606,628 * | 2/1997 | Miyabe et al. | 382/183 |
| 5,748,798 * | 5/1998 | Nakai et al. | 382/258 |

* cited by examiner

Primary Examiner—Joseph Mancus
Assistant Examiner—Douglas Tran
(74) Attorney, Agent, or Firm—Mark Costello

(57) ABSTRACT

A document containing colored text is reproduced in a way to preserve the color intent if the reproduced document is copied on a black-and-white device. For small text, the fact that it is colored, is conveyed by reproducing it bold, and for medium size text, by reproducing it outlined. For large text, both the fact that it is colored and the color used can be conveyed by filling the interior of the characters with patterns that correspond directly to the color.

8 Claims, 5 Drawing Sheets

PRINTING BLACK AND WHITE REPRODUCIBLE COLORED TEST DOCUMENTS

CROSS REFERENCE AND INCORPORATION BY REFERENCE

Figure 1:
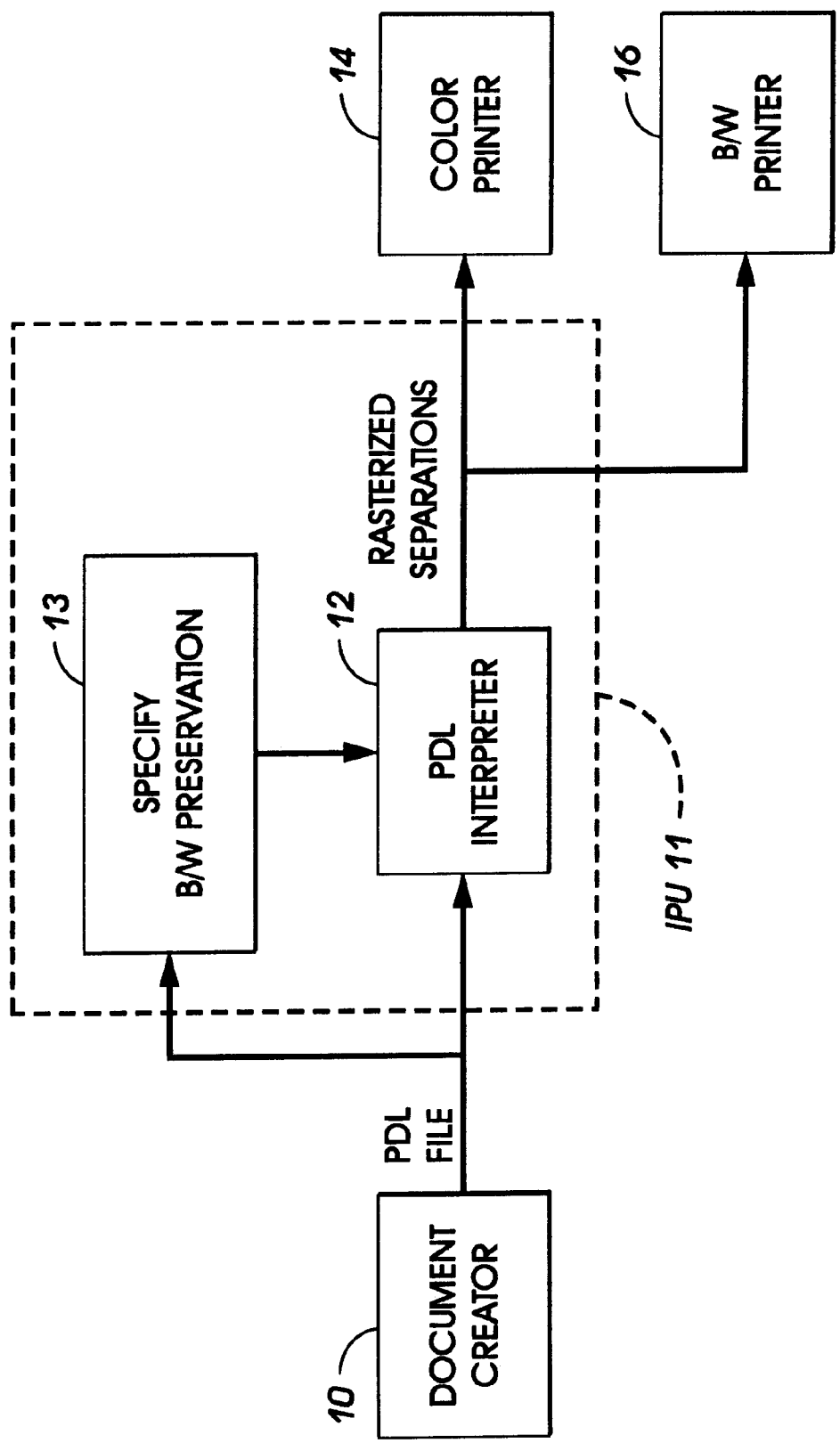

Cross reference is made to co-pending U.S. patent application Ser. No. 08/720,654 by S. Harrington and J. Taber, entitled, "Printing Black and White Reproducible Color Documents", which is also incorporated by reference for its teachings.

FIELD OF THE INVENTION

The present invention relates to a method and apparatus for printing color documents in such a manner that when the color documents are reproduced on a black and white copier or printer, their color information content is retained.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or record, but otherwise reserves all copyright rights whatsoever.

BACKGROUND OF THE INVENTION

Color printers and copiers usually operate in work environments that still include black and white devices. While color printing has become increasingly common in the workplace, the cost of color printing still remains substantially above that of black and white printing. Thus, while color documents can be readily created for small volume use, large volume reproduction suggests that black and white printers or copiers should be used.

When a color document is copied to black and white, the information conveyed by the color can be lost. Information is often conveyed by color through the use of distinct colors representing distinct information. When color documents are copied on a black and white copier, or faxed on a black and white facsimile machine, or reproduced from a color file to a black and white print, information may be lost. These devices usually threshold the luminance component of the source image to represent the image in either black or white, raising the problem of translating the intermediate luminance of colored objects on a page. Many darker colors often copy as black, while lighter colors drop out completely. When gray tones are reproduced, they are often mottled or ragged. Ironically, increases in printer resolution and halftone frequency that improve color image quality act to exacerbate the copy problem. Increases in printer resolution make the image appear to the copier as well as to the human observer as smooth areas of intermediate luminance rather than a pattern of halftone dots.

Even if a copier could reproduce the luminance level of source colors reliably, many different colors have the same luminance and are therefore indistinguishable after copying. This may not be a severe problem for pictorial images where much of the information is in the luminance component, but for text or presentation graphics, color offers new dimensions for conveying information. Color can be used to organize important items, distinguish categories, and organize documents and document content. However, when copied or faxed to black and white, the distinguishing capability of color is lost.

The primary goals of most documents is to convey information. If one can anticipate that the document will be copied or faxed with a black-and-white reproduction device, and information might, therefore, be lost; it might be desirable to sacrifice some of the appearance of the original document for the sake of information content. One might, for example, decide not to use color at all. Alternatively, a selection may be made to use only color and color features that can be copied well. Such choices are significant barriers in document creation.

It is known that selected background and/or alphanumeric text areas may be printed in repeating and/or varying patterns of highlight color and interposed with black repeating or varying patterns as disclosed, for example, for single pass xerographic printing of composite image security documents in U.S. Pat. No. 5,291,243 to Heckman et al. Some of such color patterns might also reproduce when such documents are copied on a black and white copier, however, such copying is not reliable.

Of further background interest are U.S. Pat. No. 5,308,553 to Roetling and U.S. Pat. No. 5,153,576 to Harrington. These patents, however, electronically convert a full color document into a monochrome facsimile for subsequent monochrome printing by electronically converting pixel by pixel the original solid colors into various different patterns of black only images. Such an arrangement, by definition, does not produce originals, which are reproduced in color, for subsequent copying on a black and white copier which retains the informational content of the original color image. Further, the patterns that these methods produce are limited either to a fixed set, or to designs directly controlled by only the three color components and where areas controlled by the different color components do not overlap.

Other patents of interest include U.S. Pat. No. 4,703,318 to Haggerty, which illustrates the idea of forming a character based monochromatic image from a digital representation of a color image by: (1) forming a character based representation of the color image in which a plurality of color characters each describe the background or foreground color within a defined area of the color image; (2) providing a plurality of color pattern masks each corresponding to a color in the color image comprising a pattern of light and dark dots capable of providing in the monochromatic image visual discrimination between areas of different color; (3) transforming the color characters into monochromatic characters by replacing the background and foreground colors of each color character in the corresponding pattern of light and dark dots; and (4) displaying the monochromatic characters on a character based output device. The present invention differs from Haggerty in that the goal is to produce a printed image in which is copyable, and in which colors and shades of colors can be reproduced to maintain the informational content of the original document which used those colors.

U.S. Pat. No. 3,807,852 to Hoydic illustrates an arrangement in which color is used to identify particular identified areas for copying on a black and white copier.

U.S. Pat. No. 5,321,470 to Hasuo et al relates to an arrangement which uses color and the processes of a color copier to prevent forgery of color documents by improper copying.

U.S. Pat. No. 5,138,465 to Ng et al relates to an apparatus and method for producing selectively edited reproductions of the original document in which alphanumeric character codes written using highlighted color arrangements designated treatment to be applied to a particular document.

U.S. Pat. No. 5,153,739 to Laman et al the use of different fonts corresponding to different colors. In such an arrangement, the difference in the font itself provides distinction between different colors which copied in black and white.

U.S. Pat. No. 5,098,817 to Voorhees teaches highlighting of text in a manner which will reproduce when electronically copied. This is accomplished by applying a tone to only that area of the document to be highlighted and so that the tone remains in place during copying. The tone is sufficiently dark so as to highlight text but light enough so that the text is readable.

U.S. Pat. No. 5,142,337 to Karidis et al teaches an arrangement for reproducing gray levels in place of colors in a two color printer.

U.S. Pat. No. 5,568,248 to Wagley teaches that a pattern can be substituted for a color in a document reproduction.

The above-identified references are incorporated herein by reference for their teachings.

SUMMARY OF THE INVENTION

The present invention is directed to a method and apparatus for producing a varying pattern in colors which allows the use of color in the creation of a color original, and will retain distinguishing color content when is the color original is copied in black and white.

In accordance with one aspect of the present invention, there is provided a document reproduction system, for reproducing a document containing colored text in a format enabling improved black and white copying, retaining color intent of the color document, including: a document input, receiving electronic documents having colored text represented therein designated to be printed in a color other than black; an image processing unit, processing the documents for printing and generating new text representations in a format retaining color if printed on a color printer, and retaining color differentiation if printed on a black and white printer; and a printer, reproducing the new text representation, which when copied, retaining color intent in terms of differentiation of areas of color.

In accordance with another aspect of the invention, there is provided a method for reproducing a color document containing color text in a format enabling improved black and white copying retaining color intent of the color document including: receiving electronic documents having text representations therein designated to be printed in a color other than black; generating a new text representation in format retaining color if printed on a color printer, and retaining color differentiation if printed on a black and white printer; reproducing the text, which when copied on a black and white copier, retains color intent in terms of differentiation of areas of color.

In accordance with yet another aspect of the invention, there is provided a method for reproducing a color document containing color text in a format enabling improved black and white copying retaining color intent of the color document including: receiving electronic documents having text representations therein designated to be printed in a color other than black; determining a size for each item of text; generating a new text representation for each item of text, the generation dependent on determined size of each item of text, the new text representation in format retaining color if printed on a color printer, and retaining color differentiation if printed on a black and white printer; reproducing the text, which when copied on a black and white copier, retains color intent in terms of differentiation of areas of color.

Figure 2A:
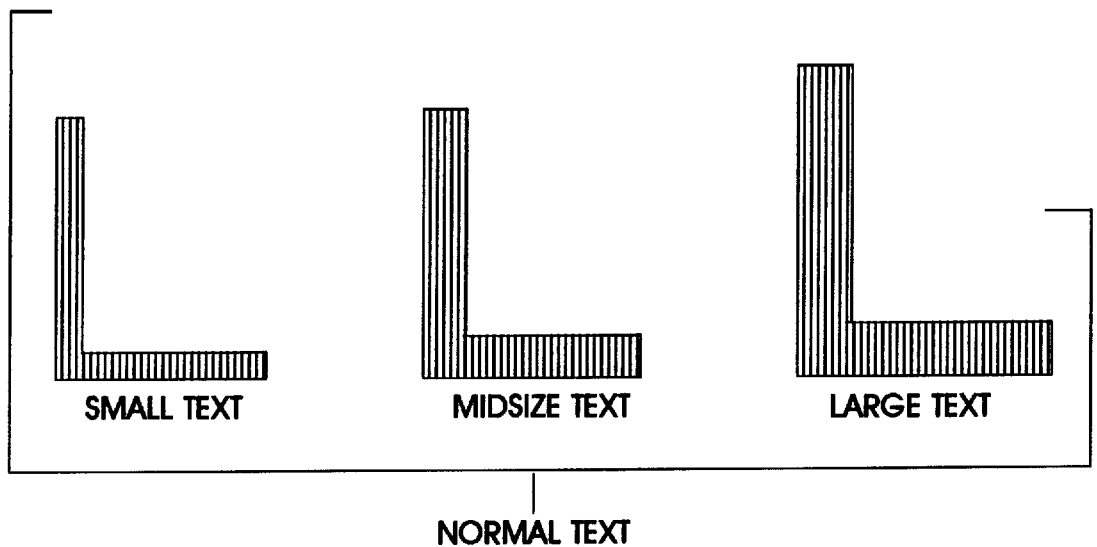
Figure 2B:
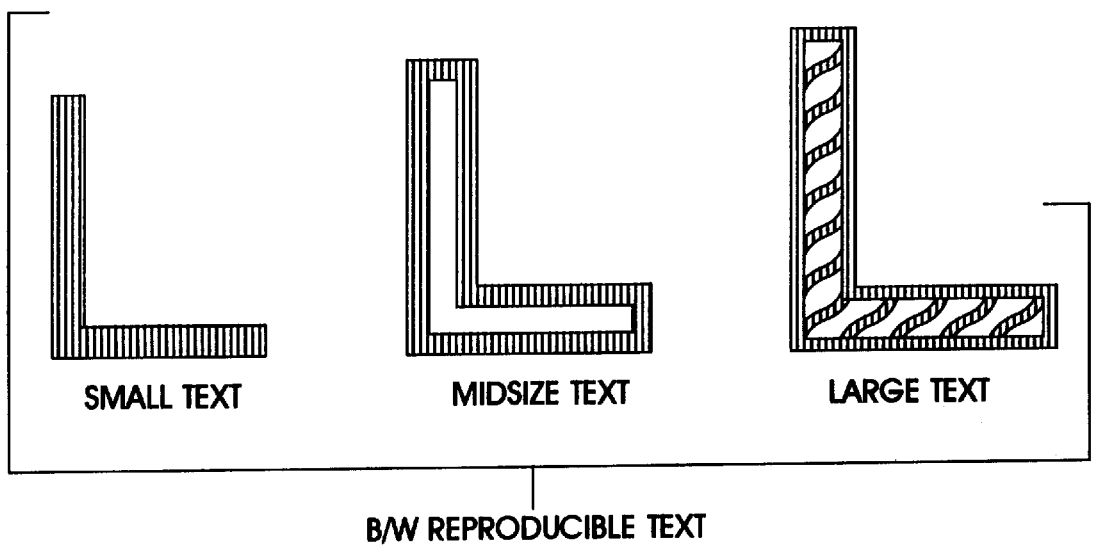
Figure 3:
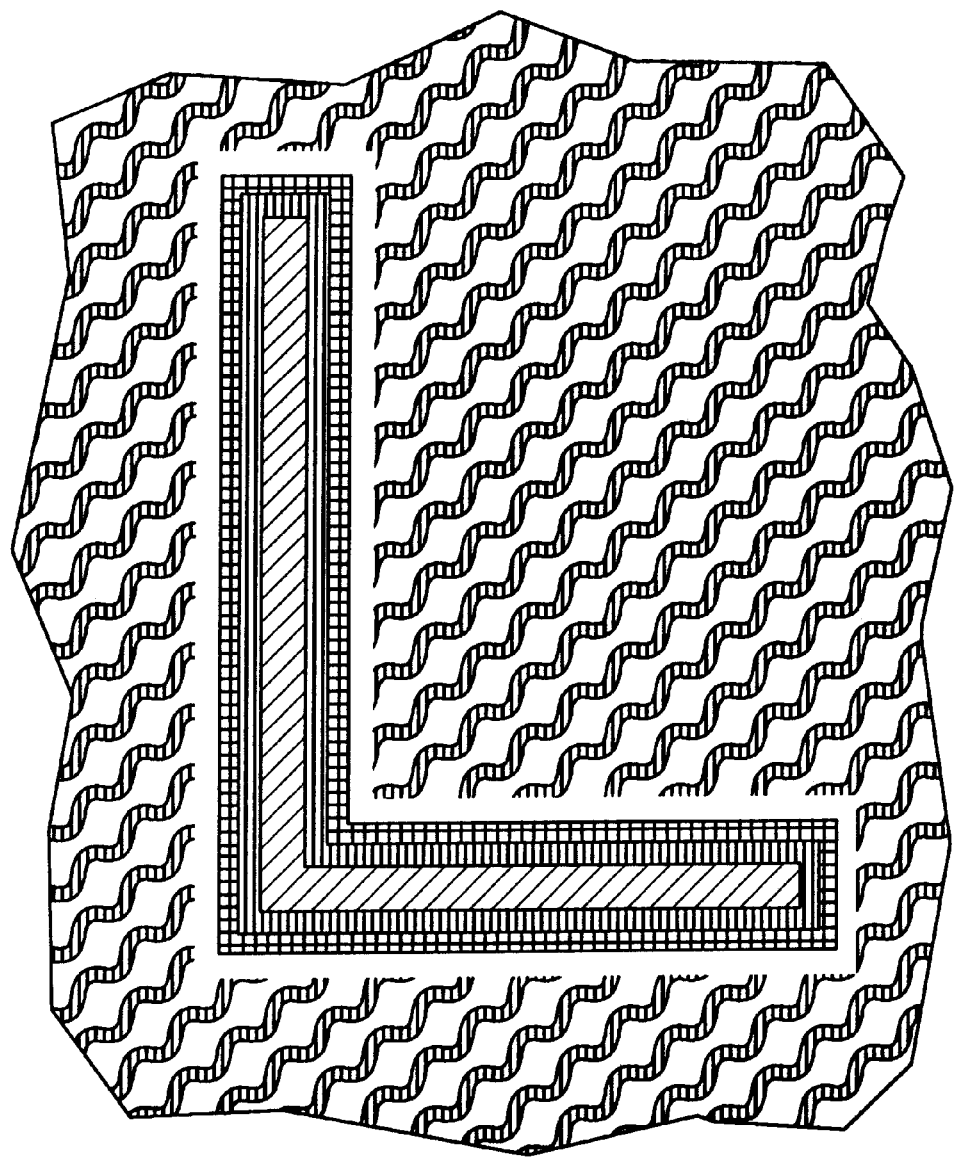
Figure 4:
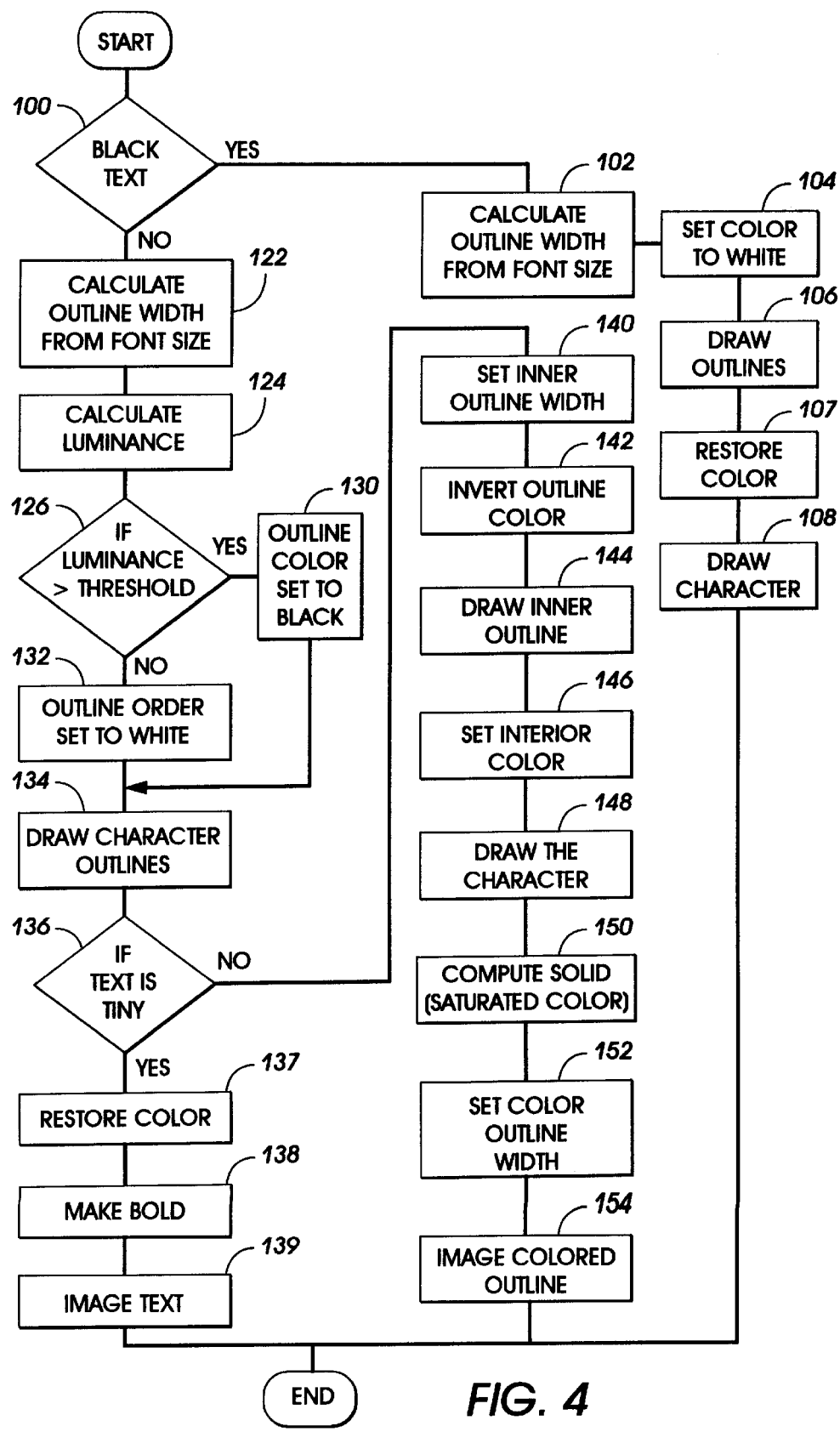
Figure 5:
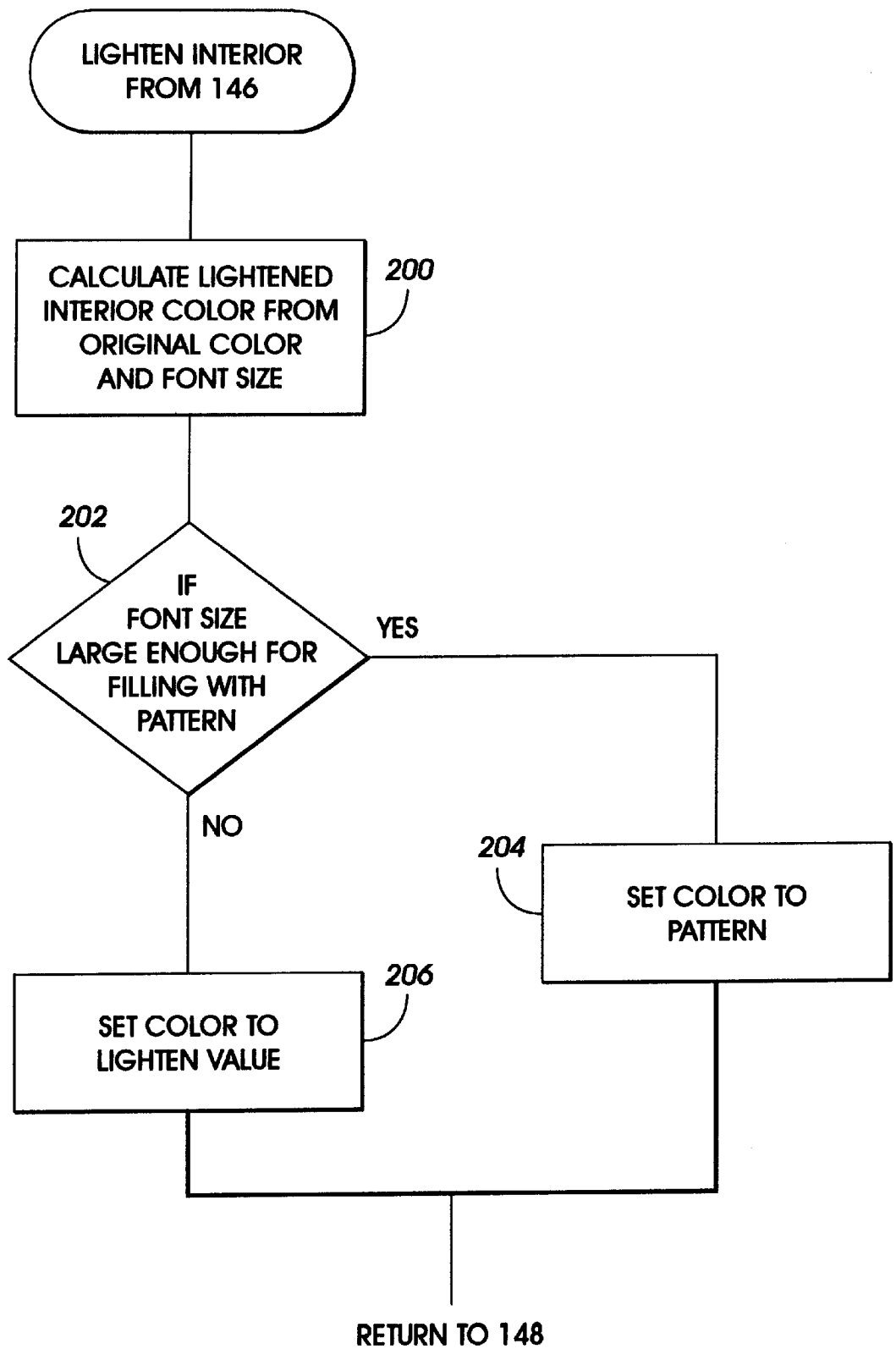

These and other aspects of the invention will become apparent from the following description used to illustrate a preferred embodiment of the invention and read in conjunction with the accompanying drawings in which:

FIG. 1 illustrates a system in which the present invention may find advantageous use;

FIGS. 2A and 2B compare an example of normal text and black and white reproducible text in accordance with the invention in each of the patterns;

FIG. 3 illustrates another form of black and white reproducible text on a colored background; and FIGS. 4 and 5 are flow charts demonstrating the overall inventive method.

Initially, the principles of the invention will be discussed before describing an embodiment of the invention. In accordance with the invention, a method to allow black and white friendly copying of large alphanumerics or text is to impose outlines on edges and specific patterns in the colors in solid areas of the characters, where the pattern has a distinctive appearance in the luminance component of the image. The idea is that upon copying, the pattern remains even though the color is lost. Thus, one can tell that the character had color and even distinguish between characters of different colors since they will have different texture patterns. The motivation is similar to that of the above-cited Roetling and Harrington patents, which map colors to black-and-white textures that can then be copied. The method described here differs, however, in that it produces colored textures that do not vary greatly from the original color for use in the original color document. Thus the original document can use color to display information, and retains its colored look if it is not copied. See, U.S. Pat. No. 5,701,401 by S. Harrington and J. Taber, entitled, "Printing Black and White Reproducible Color Documents", incorporated herein by reference.

The methods described in the Harrington et al. patent application for solid areas are inadequate for text. The problem in using patterns alone is that (unless the characters are quite large) the coarse pattern will interfere with the fine structure and thin lines of the characters. The result would be unreadable. What is needed is a technique for printing characters (using color for emphasis) in such a way that they can be copied and still remain distinguishable from ordinary characters in black-and-white.

Some ways to make black-and-white text look different are to change its "weight" (make it bold), print using outlined characters, or to fill it with a pattern. The amount of information that can be conveyed to the black-and-white copy depends on the size of the characters. Thus, in accordance with the invention, the invention operates differentially depending on the size of received characters.

With reference to FIGS. 2A and 2B, here are three cases depending on the size of the text for very small text, making characters appear bold is the option, since the characters are too small to allow any modifications of their interiors. Comparing the small text of FIG. 2A with the modified text of FIG. 2B illustrates the potential for indicating that the text is colored. Text less than 6 points in size is considered small.

As shown in FIG. 2B, midsized text characters can be outlined, filling the interiors with colors that copy to white. This allows colored characters in original color documents, and black for black and white reproduction. Patterns that represent color, as in Harrington and Taber, are too large for midsized characters.

For text that is larger, one can fill the interiors with a pattern, as described in Harrington and Taber, and as shown for large text in FIG. 2B. Typically text should be 20 points or greater to be treated in this way. The larger characters should still have a solid outline to preserve their shapes and must be large enough so that the interiors contain several repetitions of the pattern cell.

The method for printing black-and-white friendly colored text makes use of the character outline for all text sizes. The character outline is printed in color as a stroke of at least one hundredth of an inch in width. For small characters this finite line width tends to fill the character's interior and widen its boundaries. The effect is to increase the character's weight so that it looks bold. Note, however, for very small characters (on the order of the normal boundary line width), the line width must be reduced or the characters will be unreadable. As the character size increases, the interior space opens to reveal the outlined character. For still larger sizes, the interior is filled with light colors and/or patterns, but the character outline is still printed in a solid color to define the character's shape.

It is possible to choose to use a color different from the specified character color for printing the outline. One may wish, for example, to choose a color that appears solid for good edge definition. This will make the colored characters easier to read as well as to copy. However, even with the mapping to solid colors, some colors may be too light to copy well. For copying, you can add black to the colored character outline. A way to do this is by drawing a thin black outline of the character down the center of the thicker colored character outline. The introduction of an outline also aids in recognizing the character shape when the character is placed on a patterned background or has a patterned interior.

Text is often placed on a colored background for presentations, and the technique for copying solid colored areas will change that background to a pattern. Then there is the problem of interference between the background pattern and the character edge. Including black-and-white boundary edges helps to overcome this problem. The desired effect is to enhance the edge. This can be done by including both black and white edging with the black edging on the side of the darker color and the white edging on the side of the lighter color, as illustrated in FIG. 3.

Unfortunately, for Page Description Language (PDL) descriptions it is difficult to know the background color, therefore you cannot tell for sure whether the character is darker or lighter. One can only guess that light characters are likely to be displayed on dark backgrounds and dark characters on light backgrounds.

Turning now to characters in which the interior rendition is important for smaller mid-sized characters, the interior is filled with white or a very light color, so there is good contrast between the interior and the outline for copying. However, for a larger midsized characters, a white interior detracts from the notion that the character is colored. To counteract this, the interior of the larger character is filled with densities of the source color that are increasingly darker as the character gets larger. The shades chosen must be light enough so that they copy as white (or light gray) to give an outlined character. At the point where the shade may copy as dark gray or black, it will be desirable to employ the pattern structure in solid areas. The shading should be adjusted with size so that the patterns are used for fonts of size about 20 points or larger.

To determine the additional color, the following determination functions may be used. Given a color (r, g, b) a lighter version of the same hue can be calculated as:

$r'=1-s(1-r)$ $g'=1-s(1-g)$ $b'=1-s(1-b)$ where s tells how much color to leave. If s is 0 the result is white, and if s is 1 the color is unchanged. The shading parameter s can be set as a function of the font size f or of both font size and the luminance y of the source color. The luminance can be approximated as $y=r/4+5g/8+b8$.

For example $s=(f3/(f3+a))3$ or $s=(f3/(f3+a\ y))\ 3$.

The function used can be precomputed and stored in tables for efficiency. The parameter a is a constant that depends on how the size of the font is measured and at what size the color should drop out. Many other functions are possible.

The font size can also be used to decide when patterns should be imposed. The modified colors (r', g', b') can be used in constructing the pattern to help reduce the abruptness of the transition, although using the original color (r, g, b) is also possible.

At the PDL level, characters in this style can be formed by overlaying solid and outlined characters at various outline widths and colors. For example, to produce a character with light pink interior and a solid red boundary surrounded by black edging, surrounded in turn by white edging, you would first print the character outline with a large width in white and then overlay this with the character outline at medium width in black. The outline is would be printed once more at a small width in red, and final a solid character would be printed in pink. Windows Graphics Device Interface (GDI) also gives access to character outlines for some fonts and may permit this approach. More efficient implementations should be possible in the rasterization software where rasters for each outline can be precomputed and cached. The APPENDIX attached provides an operative example in the Postscript language (a product of the Adobe Corporation).

Referring initially to FIG. 1, a simplistic description of a possible environment for the invention is shown. A document creator 10, perhaps a computer or word processor, generates a file in a PDL or page description language. An image processing unit 11 includes, among other functions, a PDL interpreter 12, and a black and white preservation specification function 13. Determination of whether black and white preservation rendering will be applied occurs within the IPU, at block 13 responsive to the PDL file directed thereto. The PDL is a relatively high level language, which must be interpreted or decomposed to generate a rasterized image for use by a printer. Typically, a decomposer or interpreter 12, which accomplishes this task can be in either a computer attached to a printer, or be combined or combinable with a printer, as a "printer front end" or Electronic Sub System, or ESS. Upon generating a rasterized version of the image, the decomposer passed the image to a printer engine for printing. A document is output as a result of the process. The printer in the particular environment shown may be either a color printer 14 or a black and white printer 16. In this environment, an ON/OFF switch is provided, suitably by a user interface command to the application software, to turn ON or OFF the black and white reproducible print option.

With reference now to FIG. 4, a flow chart illustrating a digital processor implementation of the present invention is provided, to produce characters as in FIG. 3. Based on the PDL file, information will be available, identifying whether an object on a page is text or not. Additionally, information about the color and size of the text will be available.

With reference to the Show module in the attached software APPENDIX, initially, we assume that an object is known to include text. At step 100, the text is checked to see whether it contains black text (yes) or colored text (no). If the text is black, then the outline's width of each character is calculated from the font size, at step 102. At step 104, the color of the outline is set to white. At step 106, the outline of the text characters is drawn, color is restored to the image at step 107, and at step 108, the characters are drawn (in a PDL, the character is generated separately from its outline), and the rasterized image is generated.

If the text is non-black or colored, then the outlines width is calculated from the font size, at step 122. The luminance value of the color selected is calculated at step 124. At step 126, if the luminance level of the color is greater than a preselected threshold value, then the outline color is set to black at step 130, and otherwise set to white at step 132. At step 134, the outline of the text characters is drawn. At step 136 if the text is very small, based on the provided font size, color is restored to the image at step 137, and the small text is made bold, at step 138. The text is then imaged at step 138 in its original color.

If the text is not very small, such as, for example, midsized or large text, then after step 136, based on font size, the inner outline width is set at step 140, the outline color is inverted at step 142 and the inner outline is drawn at step 144.

At step 146, the interior color is set, based on the algorithm previously described, using the luminance and of the color of the text. At this point, we enter the routine of FIG. 5, to calculate the lightened interior portion of the character. At step 200, we calculated a lightened interior color, based on the original color and font size. At step 202, if the font is large enough, at step 204, we fill the character with a pattern. If at step 202, we determine that the font is not large enough to use a pattern, we set the interior color of the character to the determined lightened value.

Returning to FIG. 4, at step 148, the character is drawn, and at step 150, the solid or saturated color for the character is determined. At step 152 the color outline width is set and step 154, the colored outline is imaged.

It will no doubt be appreciated that this algorithm can be used for formatting text to be printed in color text that is highly reproducible in black and white copying, or printed directly in black, in which case, the text is still formatted in a manner allowing black and white copying.

The disclosed method may be readily implemented in software using object oriented software development environments that provide portable source code that can be used on a variety of computer or workstation hardware platforms. Alternatively, the disclosed image processing system may be implemented partially or fully in hardware using standard logic circuits or specifically on a single chip using Very Large Scale Integration design. Whether software or hardware is used to implement the system varies depending on the speed and efficiency requirements of the system and also the particular function and the particular software or hardware systems and the particular microprocessor or microcomputer systems being utilized. The image processing system, however, can be readily developed by those skilled in the applicable arts without undue experimentation from the functional description provided herein together with a general knowledge of the computer arts.

While this invention has been described in conjunction with a preferred embodiment thereof, it is evident that many alternatives, modifications, and variations will be apparent to those skilled in the art. Accordingly, it is intended to embrace all such alternatives, modifications and variations as fall within the spirit and broad scope of the appended claims.

I claim:

1. A method for reproducing a color document containing color text in a format enabling improved black and white copying retaining color intent of the color document including:

receiving electronic documents having text representations therein designated to be printed in a color other than black;

determining a size for each item of text;

generating a new text representation for each item of text, said generation dependent on determined size of each item of text, said new text representation in format retaining color if printed on a color printer, and retaining color differentiation if printed on a black and white printer;

reproducing said text, which when copied on a black and white copier, retains color intent in terms of differentiation of areas of color, wherein for items of text determined to be large, and to be printed on a lighter colored background in said electronic document, said generating step generates text with an interior having a black and white reproducible pattern representing said color other than black, a first outline surrounding said interior in said color other than black, a second outline in black and a third outline in white.

2. A method for reproducing a color document containing color text in a format enabling improved black and white copying retaining color intent of the color document including:

receiving electronic documents having text representations therein designated to be printed in a color other than black;

determining a size for each item of text;

generating a new text representation for each item of text, said generation dependent on determined size of each item of text, said new text representation in format retaining color if printed on a color printer, and retaining color differentiation if printed on a black and white printer;

reproducing said text, which when copied on a black and white copier, retains color intent in terms of differentiation of areas of color, and wherein for items of text determined to be large and to be printed on a darker colored background in said electronic document, said generating step generates text with an interior having a black and white reproducible pattern representing said color other than black, a first outline surrounding said interior in said color other than black, a second outline in white and a third outline in black.

3. A method for reproducing a color document containing color text in a format enabling improved black and white copying retaining color intent of the color document including:

receiving electronic documents having text representations therein designated to be printed in a color other than black;

determining a size for each item of text;

calculating luminance of each item of text;

using calculated luminance to set an outline color for each item of text to black or white;

generating character outlines for each item of text, using said set outline color;

generating a new text representation for each item of text, said generation dependent on determined size of each item of text, said new text representation in format particular to each of a set of size ranges, and retaining color if printed on a color printer, and retaining color differentiation if printed on a black and white printer;

reproducing said text, which when copied on a black and white copier, retains color intent in terms of differentiation of areas of color.

4. The method as defined in claim 3, wherein for items of text determined to be relatively small in size, said generating step generates bold text.

5. The method as defined in claim 3, wherein for items of text to be determined to be midsized, said generating step generates text with a light interior and an outline in said color other than black.

6. The method as defined in claim 3, wherein for items of text to be determined to be large in size, said generating step generates text with an interior having a black and white reproducible pattern representing said color other than black, and an outline in said color other than black.

7. The method as defined in claim 3, wherein for items of text determined to be large and to be printed on a lighter colored background in said electronic document, said generating step generates text with an interior having a black and white reproducible pattern representing said color other than black, a first outline surrounding said interior in said color other than black, a second outline in black, and a third outline in white.

8. The method as defined in claim 3, wherein for items of text determined to be large, and to be printed on a darker colored background in said electronic document, said generating step generates text with an interior having a black and white reproducible pattern representing said color other than black, a first outline surrounding said interior in said color other than black, a second outline in white, and a third outline in black.

\* \* \* \* \*